United States Patent
Min et al.

(10) Patent No.: US 10,191,321 B2
(45) Date of Patent: Jan. 29, 2019

(54) REFLECTIVE POLARIZING MODULE HAVING PARTICLES AND BACKLIGHT UNIT INCLUDING SAME

(71) Applicant: LMS CO., LTD, Pyeongtaek-si, Gyeonggi-do (KR)

(72) Inventors: Jee Hong Min, Seongnam-si (KR); Eun Mi Lee, Suwon-si (KR)

(73) Assignee: LMS CO., LTD, Pyeontaek-si, Gyeonggi-do (KR)

( * ) Notice: Subject to any disclaimer, the term of this patent is extended or adjusted under 35 U.S.C. 154(b) by 0 days.

(21) Appl. No.: 15/574,899

(22) PCT Filed: May 16, 2016

(86) PCT No.: PCT/KR2016/005156
§ 371 (c)(1),
(2) Date: Nov. 17, 2017

(87) PCT Pub. No.: WO2016/186410
PCT Pub. Date: Nov. 24, 2016

(65) Prior Publication Data
US 2018/0164637 A1    Jun. 14, 2018

(30) Foreign Application Priority Data

May 18, 2015   (KR) .................. 10-2015-0069000

(51) Int. Cl.
*G02F 1/1335*   (2006.01)
*G02B 1/10*   (2015.01)
*G02B 5/02*   (2006.01)

(52) U.S. Cl.
CPC ......... *G02F 1/133536* (2013.01); *G02B 1/10* (2013.01); *G02B 5/0221* (2013.01); *G02F 1/13362* (2013.01)

(58) Field of Classification Search
CPC ..................... G02F 1/13362; G02F 1/133536
See application file for complete search history.

(56) References Cited

U.S. PATENT DOCUMENTS

| | | | | |
|---|---|---|---|---|
| 7,446,827 B2 * | 11/2008 | Ko | ............... | G02F 1/133606 |
| | | | | 349/64 |
| 2013/0148198 A1 * | 6/2013 | Min | ............. | G02B 27/00 |
| | | | | 359/485.03 |

FOREIGN PATENT DOCUMENTS

| KR | 10-2008-0008065 A | 1/2008 |
|---|---|---|
| KR | 10-2008-0042908 A | 5/2008 |

(Continued)

*Primary Examiner* — Robert J May
(74) *Attorney, Agent, or Firm* — Novick, Kim & Lee, PLLC; Jae Youn Kim

(57) ABSTRACT

The present invention provides a reflective polarizing module that comprises: a reflective polarizing sheet that has a plurality of layers with different refractive indexes stacked on each other and selectively transmits light; a first light-condensing sheet having a first structuralized pattern in which a first unit light-condensing object having a gradually decreasing transverse cross-sectional area toward the upper portion thereof is continually repeated, wherein the upper end portion of the first unit light-condensing object is bonded to the lower portion of the reflective polarizing sheet such that the upper end portion has a first width in the transverse direction; and a coating layer located on the upper surface of the reflective polarizing sheet and having a plurality of particles that diffuse the light transferred through the reflective polarizing sheet, wherein at least some of the plurality of particles have diameters that are smaller than the first width.

11 Claims, 6 Drawing Sheets

(56) References Cited

FOREIGN PATENT DOCUMENTS

| | | |
|---|---|---|
| KR | 10-2009-0116002 A | 11/2009 |
| KR | 10-2009-0123748 A | 12/2009 |
| KR | 10-2014-0071737 A | 6/2014 |
| KR | 10-2015-0034553 A | 4/2015 |

* cited by examiner

REFLECTIVE POLARIZING MODULE HAVING PARTICLES AND BACKLIGHT UNIT INCLUDING SAME

TECHNICAL FIELD

The present invention relates to a reflective polarizing module having different particles and a backlight unit including the same, and more particularly, to a reflective polarizing module diffusing condensed light through having a separate coating layer having particles disposed on a reflective polarizer sheet transmitting only a specific wavelength of polarized light, and a backlight unit including the same.

BACKGROUND ART

Recently, the use of flat display panels has increased, a liquid crystal display (LCD) being a representative flat display panel.

Generally, unlike an existing cathode ray tube (CRT), such an LCD requires a backlight module that provides light uniformly to an entire screen.

Specifically, such a backlight unit has a configuration providing light uniformly to a rear surface of the LCD and is configured such that a light source, i.e. a light-emitting diode (LED), is disposed along an edge of a light guide plate, and the light guide plate includes a reflective plate on a lower surface thereof to transfer light generated by the light source upwardly.

In the aforementioned configuration, the light generated by the light source is transferred upward by the light guide plate and the reflective plate, and the transferred light is uniformly transferred upwardly through a light-condensing sheet.

A sheet having a general prism formed therein may be used as the light-condensing sheet.

In addition thereto, when a separate reflective polarizer sheet is provided on an upper portion of the light-condensing sheet, brightness of the LCD can be improved.

As described above, the backlight unit is configured such that the light generated by the light source provided on the one side surface is transferred upwardly by the light guide plate and the reflective plate and the transferred light is uniformly condensed through the light-condensing sheet.

Meanwhile, when the backlight unit includes a reflective polarizer sheet, the brightness of the LCD can be considerably increased. Thus, the reflective polarizer sheet is widely used. However, when the light-condensing sheet having a plurality of prisms and the reflective polarizer sheet are bonded to each other, an upper tip portion of each of the prisms having an inclined surface may disappear while forming a bonding surface.

As described above, in the case that the upper tip portion of each of the prisms disappears and forms the bonding surface, the reflective polarizer sheet and the light-condensing sheet are bonded to each other, so that the reflective polarizer sheet and the light-condensing sheet can maintain a stable bonding state.

However, since an upper end portion of the light-condensing sheet disappears due to a bonding with the reflective polarizer sheet, a portion forming a bonding surface, i.e. an inclined surface disappears. Thus, efficiency, in which the light-condensing sheet condenses light transferred through a low portion thereof, is lowered.

In particular, when light passes though the bonding surfaces between the reflective polarizer sheet and the prisms, a line of the bonding surface is visible or a color shift phenomenon is generated, due to an optical interference phenomenon occurring in the reflective polarizer sheet formed from a multi-layered film. Thus, screen quality of a display is lowered, and an unintended Moire Phenomenon may be generated, due to optical interference with a liquid crystal panel.

DISCLOSURE

Technical Problem

An aspect of the present invention provides a reflective polarizing module having particles and a backlight unit including the same, in which condensed light is diffused by disposing a separate coating layer having particles on a reflective polarizer sheet, thereby preventing the formation of a bonding line between the reflective polarizer sheet and prisms to prevent a Moire Phenomenon caused by the bonding line.

In addition, another aspect of the present invention provides a reflective polarizing module, able to prevent a reduction in brightness by minimizing disappearance of an upper tip portion of each prism due to bonding to a lower surface of a reflective polarizer sheet, and a backlight unit including the same.

Technical problems to be solved by the present invention are not restricted to the above-mentioned issues, and any other technical problems not mentioned herein will be able to be easily appreciated from the following description by a person having ordinary skill in the art to which the present invention pertains.

Technical Solution

According to an aspect of the present invention, there is provided a reflective polarizing module including: a reflective polarizer sheet formed by staking a plurality of layers having different refractive indexes, and selectively transmitting light; a first light-condensing sheet having first structuralized patterns in which first unit light-condensing objects are continuously repeated and each have a transverse cross-sectional area gradually decreased toward an upper portion thereof, wherein an upper tip portion of each of the first unit light-condensing objects is bonded to a lower portion of the reflective polarizer sheet so as to has a first width in a transverse direction thereof; and a coating layer disposed on an upper surface of the reflective polarizer sheet and having a plurality of particles diffusing light transferred through the reflective polarizer sheet, wherein at least some of the plurality of particles have a diameter smaller than the first width.

The coating layer may have a plurality of diffusion patterns protruding from an upper surface thereof and may diffuse the light transferred through the reflective polarizer sheet.

The plurality of diffusion patterns may be non-uniformly formed and may each have a width in a transverse direction thereof smaller than the first width.

The reflective polarizing module may further include a bonding layer disposed on a lower surface of the reflective polarizer sheet, wherein the upper tip portion of each of the first unit light-condensing objects is embedded and bonded to the bonding layer so as to have a boundary surface having a second width in a transverse direction thereof. At least some of the plurality of particles may have a diameter smaller than the second width.

The bonding layer may have a plurality of non-uniform bonding patterns and may be disposed on the lower surface of the reflective polarizer sheet.

The plurality of non-uniform bonding patterns formed on the bonding layer may have a diameter in a transverse direction thereof smaller than the second width.

The bonding layer may have the plurality of particles therein.

The plurality of particles may be formed from a material having a different refractive index from a material of the coating layer.

Each of the first unit light-condensing objects may have a non-uniform height from a bottom to a top thereof on a vertical cross-section thereof.

The first unit light-condensing objects of the first structuralized patterns may be repeated in an elongated shape and may each have a height changed in an extension direction thereof.

According to another aspect of the present invention, there is provided a backlight unit including: a light guide plate including a light source on one side thereof and transferring light generated by the light source; a reflective plate stacked on a lower surface of the light guide plate and reflecting light transferred through the light guide plate upwardly; an optical module including a diffusion sheet stacked on an upper portion of the light guide plate and uniformly diffusing light transferred through a lower portion thereof, a second light-condensing sheet coupled to an upper portion of the diffusion sheet and having second structuralized patterns in which second unit light-condensing objects are continuously repeated, the second unit light-condensing objects 322a having a transverse cross-sectional area gradually decreased toward an upper portion thereof; and a reflective polarizing module including a reflective polarizer sheet formed by staking a plurality of layers having different refractive indexes, and selectively transmitting light, a first light-condensing sheet having first structuralized patterns in which first unit light-condensing objects are continuously repeated and each have a transverse cross-sectional area gradually decreased toward an upper portion thereof, wherein an upper tip portion of each of the first unit light-condensing objects is bonded to a lower portion of the reflective polarizing so as to has a first width in a transverse direction thereof, and a coating layer disposed on an upper surface of the reflective polarizer sheet and having a plurality of particles diffusing light transferred through the reflective polarizer sheet, wherein at least some of the plurality of particles have a diameter smaller than the first.

Advantageous Effects

The present invention for overcoming the aforementioned problems has the following advantageous effects.

According to an aspect of the present invention, light passing through a reflective polarizer sheet can be diffused by disposing a coating layer having particles on an upper portion of the reflective polarizer sheet, thereby reducing a Moire Phenomenon caused by periodic patterns formed a bonding surface between the reflective polarizer sheet and a light-condensing sheet.

According to another aspect of the present invention, it is possible to reduce a color shift in light passing through a reflective polarizer sheet.

According to another aspect of the present invention, since a coating layer having the particles is disposed on an upper portion of a reflective polarizer sheet and light is diffused by the particles, it is possible to minimize a reduction in light-condensing efficiency, caused by a bonding surface formed due to disappearance of a tip portion of each of structuralized patterns generated when the reflective polarizer sheet and the structuralized patterns formed on a light-condensing sheet are bonded to each other.

The effects of the present invention are not limited to those described above and other effects not stated herein may be made apparent to those skilled in the art from claims.

BEST MODE

Figure 1:
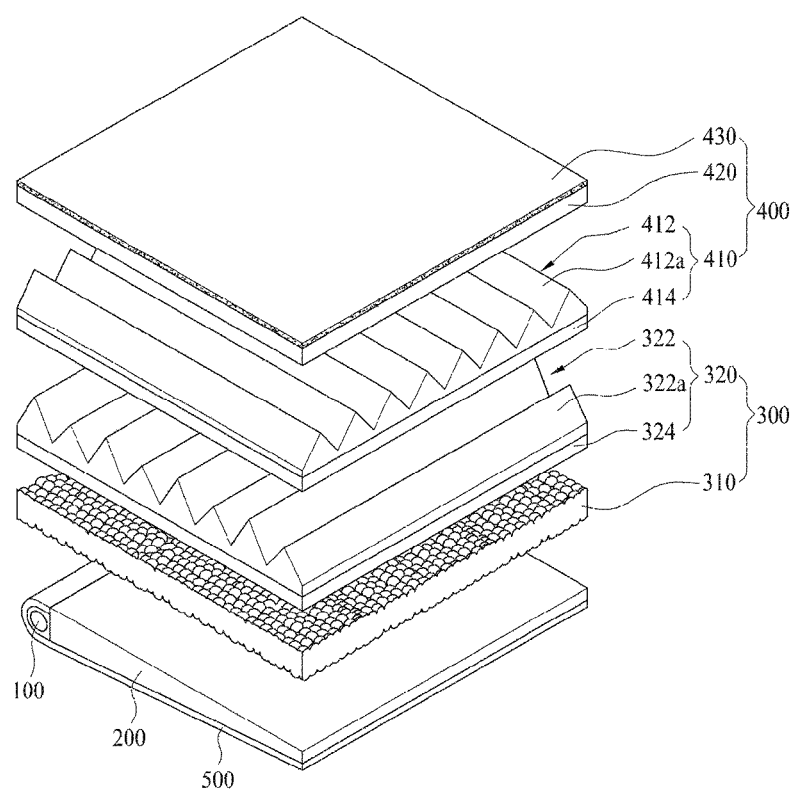
FIG. 1 is a schematic exploded perspective view illustrating a configuration of a backlight unit including a reflective polarizing module according to the present invention.

Hereinafter, exemplary embodiments of the present invention by which an object of the present invention can be concretely realized will be described with reference to the accompanying drawings. In describing the present embodiment, the same configurations are described using the same names and with the same reference numerals, and the excessive descriptions thereof will be omitted.

Hereinafter, it is illustrated that a backlight unit including a reflective polarizing module according to an embodiment of the present invention is applied to a flat liquid crystal display device, such as an LCD or LED panel. However, the present invention is not limited thereto, and an optical sheet may be independently used. The backlight unit may be applied to other apparatus rather than a liquid crystal display device, or may be applied to any device as long as a device such as a lighting device changes characteristics and a path of light.

<Configuration>

First, a schematic configuration of the backlight unit including the reflective polarizing module according to the embodiment of the present invention will be described as follows with reference to FIGS. 1 to 4.

Figure 2:
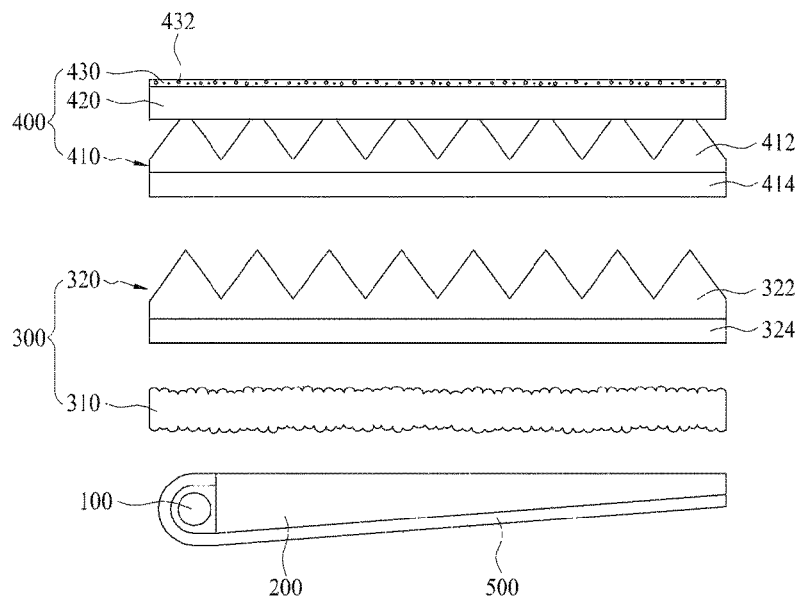
FIG. 2 is a schematic view illustrating a configuration of the reflective polarizing module and an optical module in the backlight unit of FIG. 2.

FIG. 1 is a schematic exploded perspective view illustrating a configuration of the backlight unit including the reflective polarizing module according to the present invention, and FIG. 2 is a schematic view illustrating a configuration of the reflective polarizing module and an optical module in the backlight unit of FIG. 2.

Figure 3:
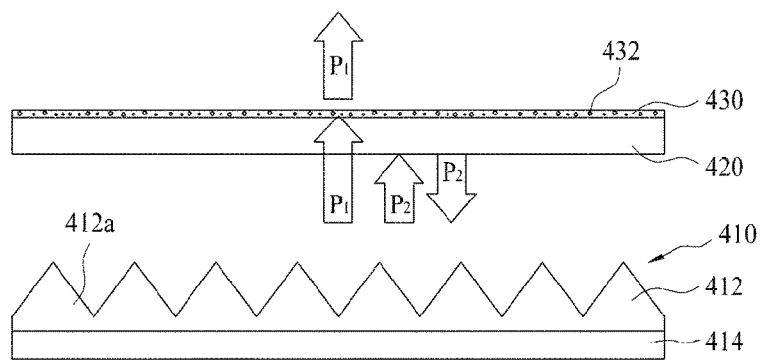
FIG. 3 is a view illustrating the reflective polarizer sheet in the backlight unit of FIG. 1, transmitting and reflecting incident light.
Figure 4:
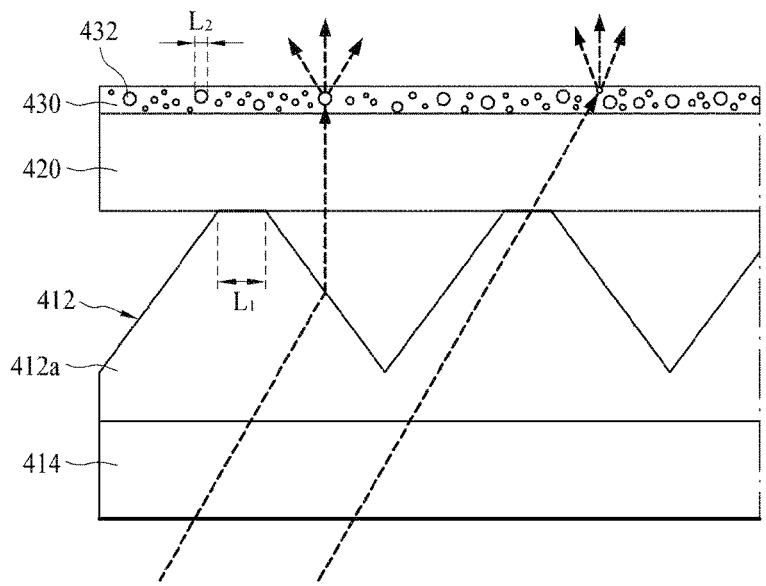
FIG. 4 is a view illustrating particles formed in a coating layer, the diameters of the particles being smaller than first widths of first unit light-condensing objects in the reflective polarizer sheet of FIG. 1.

FIG. 3 is a view illustrating a reflective polarizer sheet in the backlight unit of FIG. 1, transmitting and reflecting incident light, and FIG. 4 is a view illustrating particles formed in a coating layer, the diameters of the particles being smaller than first widths of first unit light-condensing objects in the reflective polarizer sheet of FIG. 1.

As illustrated in FIG. 1, a liquid crystal display device should essentially include a backlight unit that provides light to a liquid crystal panel. The aforementioned backlight unit mainly includes a light source 100, a light guide plate 200, a reflective plate 500, an optical module, and a reflective polarizing module 400.

The light source 100 generates light on a side portion of the light guide plate 200 and transfers the generated light to the light guide plate 200. A light-emitting diode (LED), a cold cathode fluorescent lamp (CCFL), and the like may be selectively used as the light source 100.

Light incident on the light guide plate 200 travels in a state of being totally reflected inside of the light guide plate 200. Since light incident on a surface of the light guide plate 200 at an incident angle less than a critical angle passes through the light guide plate 200 in a state of not being totally reflected, the light is emitted through an upper portion or a lower portion of the light guide plate 200. Here, the reflective plate 500 reflects the light emitted through the lower portion and allows the emitted light to be incident on the light guide plate 200 again, thereby improving light efficiency. The light guide plate 200 transfers the light incident thereon toward the optical module 300 through such a process.

The optical module 300 is disposed on an upper portion of the light guide plate 200 and has a configuration that diffuses light transferred from the light guide plate 200 and condenses the dispersed light to transfer the condensed light upwardly. The optical module 300 includes a diffusion sheet 310 and a second light-condensing sheet 320.

The diffusion sheet 310 is disposed on the upper portion of the light guide plate 200, diffuses light, and uniformly transfers light to the second light-condensing sheet 320.

Specifically, the diffusion sheet 310 has a configuration that uniformly diffuses light transferred upwardly through the light guide plate 200 disposed therebelow and the reflective plate 500 and transfers the diffused light to the second light-condensing sheet 320 disposed thereon. The diffusion sheet 310 has uneven diffusion patterns formed on an upper portion or a lower portion thereof to diffuse light.

The second light-condensing sheet 320 is coupled to an upper portion of the diffusion sheet 310 and has second structuralized patterns 322 in which second unit light-condensing objects 322a are continuously repeated, the second unit light-condensing objects 322a having a transverse cross-sectional area gradually decreased toward an upper portion thereof.

In the present invention, the second light-condensing sheet 320 mainly includes a second base film 324 and the second structuralized patterns 322.

A light-transmitting film is usually used as the second base film 324 so as to easily transmit light incident through a lower portion thereof. The second structuralized patterns 322 refracting and condensing incident light are formed on an upper surface of the second base film 324 so as to be integrated with the second base film 324.

The second structuralized patterns 322 have a plurality of second unit light-condensing objects 322a continuously repeated on the upper surface of the second base film 324, protruding upwardly, and having an inclined surface and a transverse cross-sectional area gradually decreased toward an upper portion thereof.

The second unit light-condensing objects 322a refract and condense light passing through the second base film 324 and transfer the condensed light upwardly.

Here, the second structuralized patterns 322 have a plurality of prism shapes having a longitudinal section extending in one direction.

In this case, the second unit light-condensing objects 322a may be provided in plural and may have the same size and the same shape. Alternatively, the second unit light-condensing objects 322a may have different sizes and different inclined angles.

In addition, the second unit light-condensing objects 322a may have a longitudinal section having a polygonal shape so that inclined surfaces thereof are doubled and the respective inclined surfaces have different inclined angles.

In the present embodiment, the second unit light-condensing objects 322a elongated in one direction along an upper surface of the second light-condensing sheet 320, and the plurality of second unit light-condensing objects 322a are continuously arranged.

As described above, the optical module 300 includes the diffusion sheet 310 and the second light-condensing sheet 320 to condense light transferred through a lower portion thereof and transfer the condensed light upwardly, the diffusion sheet 310 diffusing light transferred through the light guide plate 200 and the reflective plate 500, and the second light-condensing sheet 320 being disposed on an upper portion of the diffusion sheet 310 and condensing and transferring the diffused light.

Meanwhile, the reflective polarizing module 400 is stacked on an upper portion of the aforementioned optical module 300 and has a configuration that condenses and polarizes light transferred through a lower portion thereof and uniformly transfers the polarized light upwardly. In the present invention, the reflective polarizing module 400 mainly includes a reflective polarizer sheet 420, a first light-condensing sheet 410, and a coating layer 430.

The reflective polarizer sheet 420 has a configuration that transmits only specific polarized light of light condensed and transferred by the aforementioned optical module 300 and reflects the remainder thereof downwardly. The reflective polarizer sheet 420 is stacked on the upper portion of the optical module 300.

Generally, the reflective polarizer sheet 420 may be a multi-layered stack and may operate as a reflective polarizing plate or a mirror, reflecting specific polarized light. In addition, the reflective polarizer sheet 420 may function as a wavelength-selective reflection mirror such as a "cold mirror" reflecting visible light and transmitting infrared light or a "hot mirror" transmitting visible light and reflecting infrared light.

The reflective polarizer sheet 420 as used in the present invention exhibits high reflectivity with respect to normal light and an off angle and low absorptivity with respect to incident light. Such a characteristic determines whether the reflective polarizer sheet 420 is used for simple reflection or reflective polarization of light.

The reflective polarizer sheet 420 described above is formed by stacking high refractive films and low refractive films in several ten, hundred or thousand layers.

In the present invention as configured above, as illustrated in FIG. 3, light traveling toward the reflective polarizer sheet 420 is in a state in which differently polarized light beams are mixed with each other. The light includes light P1 polarized in a region in which the reflective polarizer sheet 420 transmits light, and light P2 polarized in a region in which the reflective polarizer sheet 420 does not transmits light.

As illustrated, light passing through the first light-condensing sheet 410 and the second light-condensing sheet 320 is in a state in which the light P1 and the light P2 are mixed with each other. The reflective polarizer sheet 420 transmits only the light P1 and reflects the light P2 downwardly.

While the light P1 is emitted to the outside, the light P2 is reflected to return downwardly and is reflected by the first light-condensing sheet 410, the second light-condensing sheet 320, the light guide plate 200, and the reflective plate 500 to travel upwardly again. A polarization state of the light P2 is changed through such a process. The polarization state of the light P2 is changed into an appropriate polarization state for the reflective polarizer sheet 420 to transmit the light P2.

Meanwhile, the coating layer 430 according to the present invention is disposed on an upper surface of the reflective polarizer sheet 420 and has a configuration that diffuses light transferred through the reflective polarizer sheet 420. The coating layer 430 has a plurality of particles 432 therein.

Here, the particles 432 are formed in various shapes, are formed from a different material from the coating layer 430, and diffuse light passing through the reflective polarizer sheet 420.

The particles 432 are provided in plural and are non-uniformly disposed in the coating layer 430. Here, the particles 432 have a different material or a different refractive index from the coating layer 430.

Therefore, the particles 432 reliably diffuse light transferred through the reflective polarizer sheet 420.

In the present embodiment, the particles 432 are formed in a globular shape and diffuse light transferred through the reflective polarizer sheet 420 by reflecting or refracting the light at various angles.

Alternatively, the particles 432 may be formed in various shapes such as a polygonal shape and an asymmetrical shape rather than the globular shape.

Meanwhile, the first light-condensing sheet 410 has first structuralized patterns 412 in which first unit light-condensing objects 412a are continuously repeated, the first unit light-condensing objects 412a having a transverse cross-sectional area gradually decreased toward an upper portion thereof. The first light-condensing sheet 410 is disposed on the upper surface of the second light-condensing sheet 320.

The first light-condensing sheet 410 re-condenses light, condensed and transferred by the second light-condensing sheet 320, and transfers the condensed light upwardly.

Here, the first unit light-condensing objects 412a may be identical to or different from the second unit light-condensing objects 322a described above.

In the present invention, the first light-condensing sheet 410 includes a first base film 414 and the first structuralized patterns 412 similarly to the second light-condensing sheet 320.

Here, the first structuralized patterns 412 are disposed on a lower portion of the reflective polarizer sheet 420 and on an upper surface of the first base film 414.

The first light-condensing sheet 410 described above is stacked on the lower portion of the reflective polarizer sheet 420. At least a portion of each of the first unit light-condensing objects 412a is bonded to the reflective polarizer sheet 420.

Therefore, the first light-condensing sheet 410 and the reflective polarizer sheet 420 are bonded to each other while maintaining a stable bonding state thereof.

Meanwhile, each of the first structuralized patterns 412 and the second structuralized patterns 322 is elongated in a transverse direction thereof. An extension direction of the first structuralized patterns 412 intersects with an extension direction of the second structuralized patterns 322.

In present embodiment, the extension directions of the first structuralized patterns 412 and the second structuralized patterns 322 may intersect with each other at a right angle, or merely intersect with each other.

Therefore, light diffused and transferred upwardly by the diffusion sheet 310 may be reliably condensed while passing through the first unit light-condensing objects 412a and the second unit light-condensing objects 322a.

Meanwhile, the first light-condensing sheet 410 according to the present invention is bonded to a lower portion of the reflective polarizer sheet 420 such that an upper tip portion of each of the first structuralized patterns 412 has a first width in a transverse direction thereof.

Specifically, the first unit light-condensing objects 412a are bonded to a lower surface of the reflective polarizer sheet 420, with a portion of the upper tip portion thereof disappearing during the bonding.

Here, the upper tip portion of each of the first unit light-condensing objects 412a, a portion of which disappeared, has the first width in the transverse direction.

That is, the first unit light-condensing objects 412a are bonded to the lower surface of the reflective polarizer sheet 420 such that a transverse length of a bonded portion thereof is the first width.

In the present embodiment, as illustrated, the first unit light-condensing objects 412a are directly bonded to the lower surface of the reflective polarizer sheet 420, and the upper tip portion thereof disappears and acts as an adhesive during the bonding. Here, the reference symbol L1 denotes the first width of a portion bonded to the lower surface of the reflective polarizer sheet 420.

In addition, at least some of the plurality of particles 432 provided in the coating layer 430 described above have a diameter smaller than the first width.

In the present embodiment, as illustrated, the particles 432 have a maximum diameter L2 smaller than the first width L1.

Here, the particles 432 may be formed in a form in which diffusion particles such as beads are diffused into a polymer resin or a form in which some of the diffusion particles are embedded in the polymer resin and the rest of the diffusion particles is exposed.

As described above, the particles 432 have the maximum diameter smaller than the first width L1. Accordingly, light transferred to the reflective polarizer sheet 420 through the first unit light-condensing objects 412a can be refracted upwardly to prevent a reduction in brightness.

Specifically, when the maximum diameter L2 of the particles 432 is greater than the first width L1, an angle of light refracted by the particles 432 is greater than an angle of light refracted by the first unit light-condensing objects 412a. Accordingly, light is refracted through a side of the coating layer 430 rather than a center thereof.

As a result, brightness of light passing through the coating layer 430 is overall reduced.

However, as in the present invention, since the maximum diameter L2 of the particles 432 is greater than the first width L1, light refracted and transferred by the first unit light-condensing objects 412a is diffused upwardly by the particles 432.

Therefore, in the case of light passing through the coating layer 430 by the particles 432, a reduction in brightness is minimized and internal diffusion is generated, thereby preventing quality degradation such as a Moire Phenomenon caused by a bonding surface between each of the first unit light-condensing objects 412a and the reflective polarizer sheet 420.

Furthermore, a size of the particles 432 can be adjusted to adjust brightness of light passing through the reflective polarizer sheet 420, thereby preventing a reduction in brightness of the backlight unit.

That is, since the coating layer 430 has the plurality of particles 432, is formed on the upper surface of the reflective polarizer sheet 420, and the particles 432 have the diameter smaller than the first width, the light passing through the coating layer 432 can be prevented from being diffused through the side rather the center of the coating layer 432, thereby preventing a reduction in brightness.

The backlight unit according to the present invention as configured above includes the reflective plate 500, the light guide plate 200, the optical module 300, and the reflective polarizing module 400, which are sequentially stacked. Light generated by the optical source 100 can be reliably diffused, condensed, and transferred, and light passing through the reflective polarizer sheet 420 can be diffused through the center due to the particles 432.

<Effects>

As described above, since the particles 432 are provided in the coating layer 430, light passing through the first light-condensing sheet 410 and the reflective polarizer sheet 420 can be diffused at a certain angle, thereby preventing a defect causing quality degradation of a bonding line or the like.

Generally, as the first light-condensing sheet 410 and the reflective polarizer sheet 420 are bonded to each other, the upper tip portion of each of the first unit light-condensing objects 412a partially disappears. Thus, due to the absence of an inclined surface reflecting light transferred through a lower portion of the first unit light-condensing objects 412a, there exists a portion on which light is not condensed.

As a result, a Moire Phenomenon or a shadow caused by a color shift and a bonding line is generated in a liquid crystal display device including the backlight to lower display quality.

However, as in the reflective polarizing module 400 according to the present invention, the particles 432 can condense and diffuse light transferred at a certain angle through a lower portion thereof, together with the first light-condensing sheet 410 by disposing the coating layer 430 having the plurality of particles 432 on the upper surface of the reflective polarizer sheet 420.

Although light transferred by the optical module 300 is not partially condensed due to a bonding surface formed as the first unit light-condensing objects 412a are bonded to the lower surface of the reflective polarizer sheet 420, the light can be diffused by the particles 432 provided in the coating layer 430, thereby preventing a reduction in brightness.

As described above, since the particles 432 are provided in the coating layer 430, light passing through the coating layer 432 can be prevented from being diffused through the side rather the center of the coating layer 432, thereby preventing a reduction in brightness.

As described above, it is desirable that the particle 432 having a maximum size among the plurality of particles 432 has a diameter smaller than the first width, and thus, light can be reliably diffused such that a shadow due to a bonding surface between each of the first unit light-condensing objects 412a and the reflective polarizer sheet 420 is not generated.

As described above, the particles 432 can have the diameter smaller than the first width and at least one particle 432 can be placed on the bonding surface between each of the first unit light-condensing objects 412a and the reflective polarizer sheet 420, thereby reliably diffusing light.

The particles 432 can have the diameter smaller than the first width, and concurrently, the particles 432 can have various sizes in the coating layer 430, and brightness can be adjusted by adjusting a size of the particles 432 when the coating layer 430 is formed.

Since the particles 432 are provided in the coating layer 430 and have the diameter smaller than the first width, as described above, it is possible to diffuse light not condensed due to the bonding surface between the first light-condensing sheet 410 and the reflective polarizer sheet 420. Accordingly, light passing through the first light-condensing sheet 410 and the reflective polarizer sheet 420 can be diffused at a certain angle to prevent the generation of a Moire Phenomenon such as a stripe pattern or a color shift phenomenon in a liquid crystal display device.

In addition, since the coating layer 430 having the particles 432 is disposed on the upper portion of the reflective polarizer sheet 420 and light is diffused by the particles 432, it is possible to prevent a reduction in light-condensing efficiency, caused by a bonding surface formed due to disappearance of the tip portion of each of the first structuralized patterns 412 generated when the reflective polarizer sheet 420 and the first structuralized patterns 412 formed on the first light-condensing sheet 410 are bonded to each other.

<Modified Form>

Next, a modified form of the coating layer 430 according to the present invention will be described as follows with reference to FIG. 5.

Figure 5:
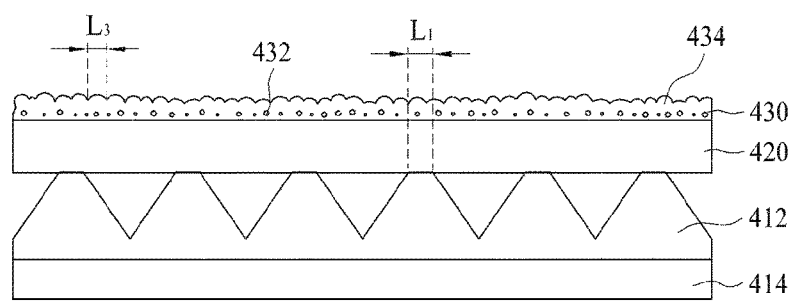
FIG. 5 is a view illustrating separate diffusion patterns formed on the coating layer of the reflective polarizing module of FIG. 1.

FIG. 5 is a view illustrating separate diffusion patterns formed on the coating layer 430 of the reflective polarizing module 400 of FIG. 1.

Referring to the drawing, the separate diffusion patterns 434 are further formed on the coating layer 430 having the particles 432 on the reflective polarizer sheet 420.

Specifically, the separate diffusion patterns 434 protrude from an upper surface of the coating layer 430, are provided in plural, and are irregular patterns.

In the present embodiment, the separate diffusion patterns 434 are formed in a general globular protrusion and are irregularly arranged on the upper surface of the coating layer 430. Here, the separate diffusion patterns 434 have non-uniform sizes and each have a width in a transverse direction thereof smaller than the first width.

As described above, since the separate diffusion patterns 434 are formed on the upper surface of the coating layer 430, together with the particles 432, the separate diffusion patterns 434 can diffuse light that is not condensed by the first light-condensing sheet 410 and is transferred through the reflective polarizer sheet 420.

Here, since the separate diffusion patterns 434 formed in a protrusion shape have a maximum size L3 in a transverse direction thereof smaller than the first width L1, it is possible to diffuse light that is not condensed and is transferred through a bonding surface formed by a bonding between each of the first structuralized patterns 412 and the lower surface of the reflective polarizer sheet 420.

The separate diffusion patterns 434 on the coating layer 430 according to the present embodiment may be formed through a replication process using a master and may be formed using a separate processing roll.

A state in which a separate bonding layer 440 is further included in the reflective polarizing module 400 according to the present invention will be described as follows with reference to FIGS. 6 to 8.

Figure 6:
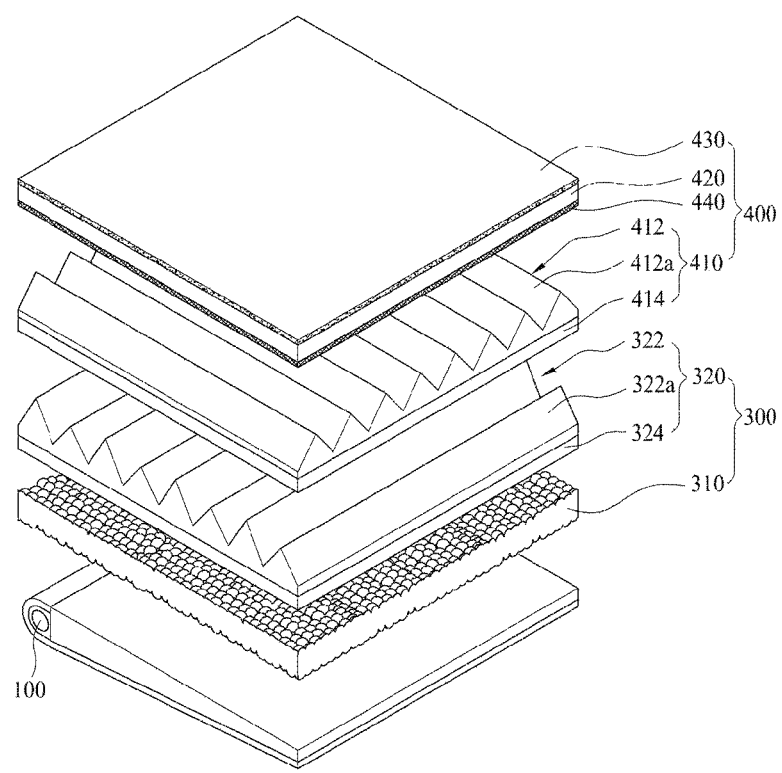
FIG. 6 is a view illustrating a separate bonding layer is formed on a lower surface of the reflective polarizer sheet in the backlight unit of FIG. 1.
Figure 7:
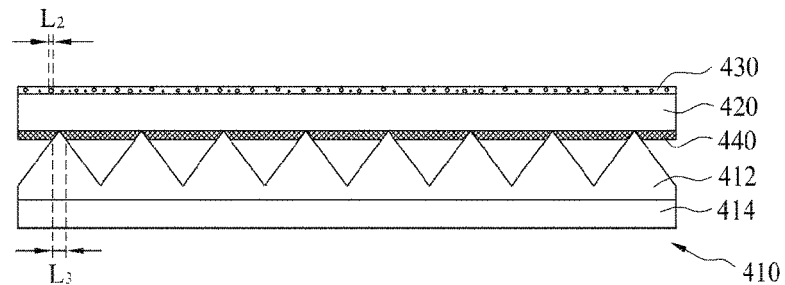
FIG. 7 is a lateral view illustrating a reflective polarizing module of FIG. 6.
Figure 8:
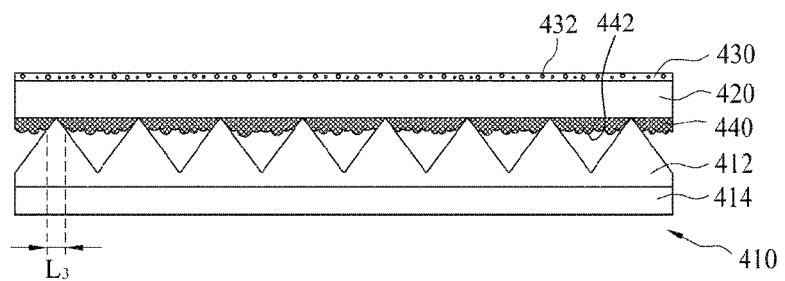
FIG. 8 is a view illustrating separate bonding patterns formed on the bonding layer formed on the lower surface of the reflective polarizer sheet of FIG. 6.

FIG. 6 is a view illustrating the separate bonding layer 440 formed on a lower surface of the reflective polarizer sheet 420 in the backlight unit of FIG. 1, FIG. 7 is a lateral view illustrating the reflective polarizing module 400 of FIG. 6, and FIG. 8 is a view illustrating separate bonding patterns 442 formed on the bonding layer 440 formed on the lower surface of the reflective polarizer sheet 420 of FIG. 6.

FIGS. 6 and 7 illustrates that the separate bonding layer 440 is further included in the backlight unit according to the present invention. The coating layer 430 is formed on the upper surface of the reflective polarizer sheet 420, and concurrently, the separate bonding layer 440 is formed on the lower surface of the reflective polarizer sheet 420.

Specifically, the separate bonding layer 440 may be disposed on a portion or a whole of the lower surface of the reflective polarizer sheet 420 and may have a uniform thickness or a non-uniform thickness.

In the present embodiment, the separate bonding layer 440 is formed at a uniform thickness on the lower surface of the reflective polarizer sheet 420, and the upper tip portion of each of the first structuralized patterns 412 formed on the first light-condensing sheet 410 is embedded in the separate bonding layer 440.

Here, it is desirable that the upper tip portion of each of the first unit light-condensing objects 412a embedded in the separate bonding layer 440 disposed on the lower surface of the reflective polarizer sheet 420 is embedded such that a boundary surface between the upper tip portion and the separate bonding layer 440 has a second width in a transverse direction.

That is, when the first unit light-condensing objects 412a are embedded in the separate bonding layer 440, a transverse length of an embedded portion is the second width L3 in the transverse and is smaller than the maximum diameter L2 of the particles 432 included in the coating layer 430.

Therefore, although a bonding surface is formed due to the first unit light-condensing objects 412a being embedded in the separate bonding layer 440, light transferred from below can be diffused by the separate diffusion patterns 434 or the particles 432.

As described above, since the separate bonding layer 440 is further provided in the reflective polarizing module 400, the bonding surface between the first light-condensing sheet 410 and the reflective polarizer sheet 420 can be increased to increase bonding strength. Accordingly, it is possible to maintain a more stable bonding state between the first light-condensing sheet 410 and the reflective polarizer sheet 420.

The separate bonding layer 440 may be formed from the same material as the first light-condensing sheet 410 or may be formed from a material having a different refractive index from a material of the first light-condensing sheet 410.

Meanwhile, referring to FIG. 8, a plurality of bonding patterns 442 may be non-uniformly formed on the separate bonding layer 440.

Here, the plurality of bonding patterns 442 protrude downwardly to have a protrusion shape like the separate diffusion patterns 434. Each protrusion shape may have a diameter smaller than the second width L3 in the transverse direction.

As described above, since the separate bonding patterns 442 are formed on the separate bonding layer 440, although a bonding surface is formed due to a portion of the first unit light-condensing objects 412a being embedded, light transferred from below can be diffused by the separate diffusion patterns 434 or the particles 432, and concurrently, only a portion of each of the first unit light-condensing objects 412a are embedded in the separate bonding layer 440, thereby improving a light-condensing effect by minimizing disappearance of an inclined surface.

Although not illustrated in the drawings in the present disclosure, the plurality of particles 432 may be provided in the coating layer 430 as well as the bonding layer 440 and may diffuse light condensed by the first light-condensing sheet 410.

A modified form of the first structuralized patterns 412 in the reflective polarizing module 400 according to the present invention will be described as follows with reference to FIGS. 9 and 10.

Figure 9:
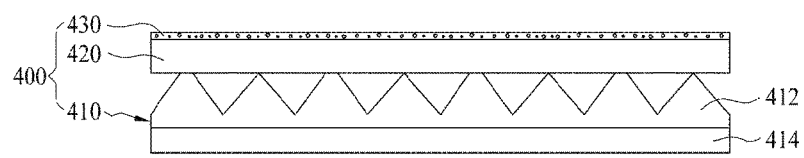
FIG. 9 is a view illustrating non-uniform heights of first unit light-condensing objects formed in the reflective polarizing module of FIG. 1.
Figure 10:
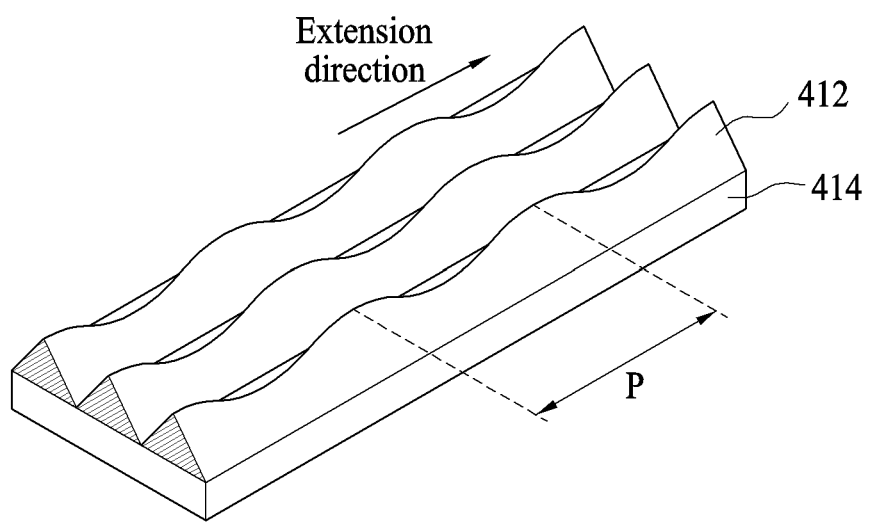
FIG. 10 is a view illustrating the first unit light-condensing objects in the reflective polarizing module of FIG. 1, the heights of respective condensing objects varying in extension directions thereof.

FIG. 9 is a view illustrating non-uniform heights of respective first unit light-condensing objects 412a of the first structuralized patterns 412 formed in the reflective polarizing module 400 of FIG. 1, and FIG. 10 is a view illustrating the first unit light-condensing objects in the reflective polarizing module 400 of FIG. 1, the heights of respective condensing objects varying in an extension direction thereof.

Referring to FIG. 9, unlike described above, a plurality of first unit light-condensing objects 412a are spaced apart from one another along an upper surface of the first base film 414. Although not illustrated, the plurality of first unit light-condensing objects 412a are spaced apart from one another on the upper surface of the first base film 414.

As illustrated, the plurality of first unit light-condensing objects 412a have non-uniform heights from a bottom to a top thereof.

As described above, since the plurality of first unit light-condensing objects 412a have the non-uniform heights, when the first base film 414 and the reflective polarizer sheet 420 are bonded to each other, only a portion of each of the plurality of first unit light-condensing objects 412a is bonded to the reflective polarizer sheet 420 and the rest of each of the plurality of first unit light-condensing objects 412a is not bonded.

As described above, as only a portion of each of the plurality of first unit light-condensing objects 412a is bonded to the lower surface of the reflective polarizer sheet 420, disappearance of an inclined surface of the first light-condensing sheet 410 can be decreased to minimize a reduction in a condensing effect of light transferred by the optical module 300.

Referring to FIG. 10, modified forms of the first unit light-condensing objects 412a are provided on the upper surface of the first base film 414. The plurality of first unit light-condensing objects 412a are elongated along the top surface of the first base film 414, respectively repeating in the cross-sectional direction.

Here, the plurality of first unit light-condensing objects 412a have non-uniform heights in an extension direction thereof, and only a portion of each thereof is bonded to the lower surface of the reflective polarizer sheet 420.

That is, since the plurality of the first unit light-condensing objects 412a have a certain pattern, are uniformly spaced apart from one another, have the non-uniform heights in the extension direction thereof, only a portion of one of the first unit light-condensing objects 412a is bonded to the lower portion of the reflective polarizer sheet 420.

Here, the height of each of the first unit light-condensing objects 412a may vary in a constant period P and may irregularly vary according to the extension direction.

It will be apparent to those skilled in the art that various modifications and variations can be made in the present invention without departing from the spirit or scope of the inventions. Thus, it is intended that the present invention cover all possible modifications and variations of this invention, provided they fall within the scope of the appended claims and their equivalents.

The invention claimed is:

1. A reflective polarizing module comprising:
a reflective polarizer sheet formed by stacking a plurality of layers having different refractive indexes, and selectively transmitting light;
a first light-condensing sheet having first structuralized patterns in which first unit light-condensing objects are continuously repeated and each have a transverse cross-sectional area gradually decreased toward an upper portion thereof, wherein an upper tip portion of each of the first unit light-condensing objects is bonded to a lower portion of the reflective polarizer sheet so as to have a first width in a transverse direction thereof; and
a coating layer disposed on an upper surface of the reflective polarizer sheet and having a plurality of particles diffusing light transferred through the reflective polarizer sheet, wherein at least some of the plurality of particles have a diameter smaller than the first width.

2. The reflective polarizing module of claim 1, wherein the coating layer has a plurality of diffusion patterns protruding from an upper surface thereof and diffuses the light transferred through the reflective polarizer sheet.

3. The reflective polarizing module of claim 2, wherein the plurality of diffusion patterns are non-uniformly formed and each have a width in a transverse direction thereof smaller than the first width.

4. The reflective polarizing module of claim 1, further comprising a bonding layer disposed on a lower surface of the reflective polarizer sheet, wherein the upper tip portion of each of the first unit light-condensing objects is embedded and bonded to the bonding layer so as to have a boundary surface having a second width in a transverse direction thereof.

5. The reflective polarizing module of claim 4, wherein the bonding layer has a plurality of non-uniform bonding patterns and is disposed on the lower surface of the reflective polarizer sheet.

6. The reflective polarizing module of claim 5, wherein the plurality of non-uniform bonding patterns formed on the bonding layer have a diameter in a transverse direction thereof smaller than the second width.

7. The reflective polarizing module of claim 4, wherein the bonding layer has the plurality of particles therein.

8. The reflective polarizing module of claim 1, wherein the plurality of particles are formed from a material having a different refractive index from a material of the coating layer.

9. The reflective polarizing module of claim 1, wherein each of the first unit light-condensing objects has a non-uniform height from a bottom to a top thereof on a vertical cross-section thereof.

10. The reflective polarizing module of claim 8, wherein the first unit light-condensing objects of the first structuralized patterns are repeated in a elongated shape and each have a height changed in an extension direction thereof.

11. A backlight unit comprising:
a light guide plate comprising a light source on one side thereof and transferring light generated by the light source;
a reflective plate stacked on a lower surface of the light guide plate and reflecting light transferred through the light guide plate upwardly;
an optical module comprising a diffusion sheet stacked on an upper portion of the light guide plate and uniformly diffusing light transferred through a lower portion thereof, a second light-condensing sheet coupled to an upper portion of the diffusion sheet and having second structuralized patterns in which second unit light-condensing objects are continuously repeated, the second unit light-condensing objects having a transverse cross-sectional area gradually decreased toward an upper portion thereof; and
a reflective polarizing module comprising a reflective polarizer sheet formed by stacking a plurality of layers having different refractive indexes, and selectively transmitting light,
a first light-condensing sheet having first structuralized patterns in which first unit light-condensing objects are continuously repeated and each have a transverse cross-sectional area gradually decreased toward an upper portion thereof, wherein an upper tip portion of each of the first unit light-condensing objects is bonded to a lower portion of the reflective polarizing so as to have a first width in a transverse direction thereof, and
a coating layer disposed on an upper surface of the reflective polarizer sheet and having a plurality of particles diffusing light transferred through the reflective polarizer sheet, wherein at least some of the plurality of particles have a diameter smaller than the first width.

* * * * *